(12) United States Patent
Becker et al.

(10) Patent No.: US 8,116,108 B2
(45) Date of Patent: Feb. 14, 2012

(54) METHOD FOR OPERATING A CONVERTER AND CORRESPONDING APPARATUS

(75) Inventors: Frank Becker, Karlsruhe (DE); Norbert Benesch, Heroldsberg (DE)

(73) Assignee: Siemens Aktiengesellschaft, München (DE)

( * ) Notice: Subject to any disclaimer, the term of this patent is extended or adjusted under 35 U.S.C. 154(b) by 208 days.

(21) Appl. No.: 12/498,680

(22) Filed: Jul. 7, 2009

(65) Prior Publication Data

US 2010/0008118 A1   Jan. 14, 2010

(30) Foreign Application Priority Data

Jul. 8, 2008   (EP) .................................... 08012314

(51) Int. Cl.
*H02M 7/217* (2006.01)
*H02M 7/219* (2006.01)
*H02M 7/23* (2006.01)
*H02M 7/25* (2006.01)

(52) U.S. Cl. ...................................................... 363/127
(58) Field of Classification Search .............. 363/36–37, 363/45, 48, 73–77, 118, 126–167, 84, 89
See application file for complete search history.

(56) References Cited

U.S. PATENT DOCUMENTS

| | | | | |
|---|---|---|---|---|
| 5,321,598 A * | 6/1994 | Moran | ............................. | 363/41 |
| 5,446,646 A * | 8/1995 | Miyazaki | ....................... | 363/89 |
| 5,969,958 A * | 10/1999 | Nielsen et al. | ................. | 363/41 |
| 6,185,115 B1 * | 2/2001 | Sul et al. | ........................ | 363/37 |
| 6,313,602 B1 * | 11/2001 | Arefeen et al. | ............... | 318/801 |
| 7,495,936 B2 * | 2/2009 | Ohshima et al. | ............... | 363/36 |
| 7,633,771 B2 * | 12/2009 | Sack | ............................... | 363/37 |
| 7,825,930 B2 * | 11/2010 | Kondo et al. | .................. | 345/473 |
| 7,834,579 B2 * | 11/2010 | Nojima | ........................ | 318/801 |
| 2007/0223257 A1 * | 9/2007 | Sack | ............................... | 363/37 |
| 2009/0059633 A1 * | 3/2009 | Hara et al. | ..................... | 363/126 |
| 2009/0285002 A1 * | 11/2009 | Benesch et al. | ............... | 363/127 |

FOREIGN PATENT DOCUMENTS

DE   10 2005 012 150 A1   9/2006
DE   10 2006 015 031 A1   10/2007

OTHER PUBLICATIONS

Becker F.; Scherer A., Weigold J., Braun M.; "A simple indirect voltage sensing method for IIne-connected inverters"; Power Electronics and Applications, 2007 European Conference on, Sep. 2-5, 2007, pp. 1-7, XP002511547, ISBN: 978-92-75815-10-8, retrieved Internet: URL:ieeexplore.ieee.org Others; 2007; DE.

* cited by examiner

*Primary Examiner* — Gary L Laxton
*Assistant Examiner* — Nusrat Quddus
(74) *Attorney, Agent, or Firm* — Henry M. Feiereisen; Ursula B. Day

(57) ABSTRACT

A method for operating a line-side fundamental-frequency-clocked converter is disclosed. The converters has a bridge circuit with, for example three, upper and, for example three, lower semiconductor switches, which are connected to respective positive and negative terminals of a DC link circuit. Center taps of connected pairs of the upper and lower semiconductor switches are connected to the line voltage phases. Two upper or two lower semiconductor switches are simultaneously activated during fundamental frequency operation for a predetermined time period before or after a natural trigger instant of the semiconductor switches caused by a line voltage angle. An estimated line voltage angle for clocking the semiconductor switches is tracked based on two phase currents measured while the two upper or two lower semiconductor switches are simultaneously active.

12 Claims, 9 Drawing Sheets

FIG 2
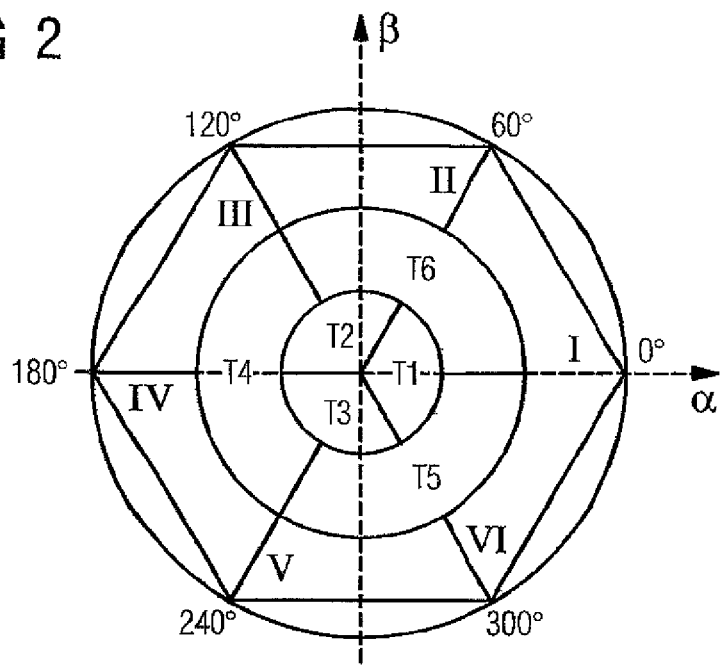
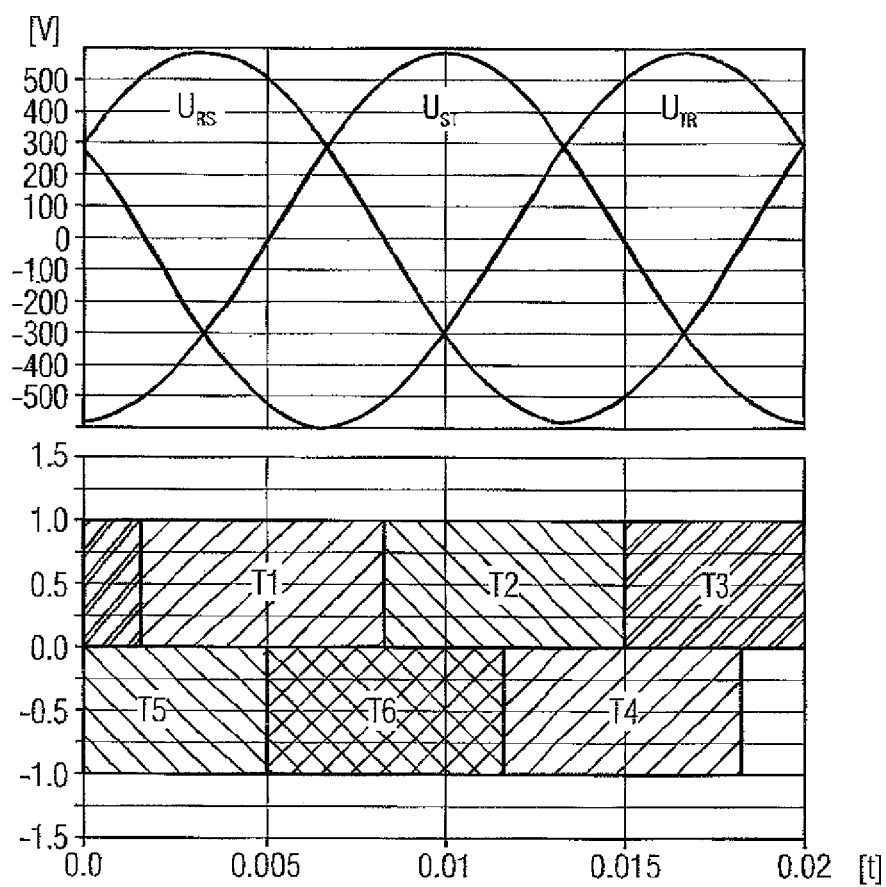

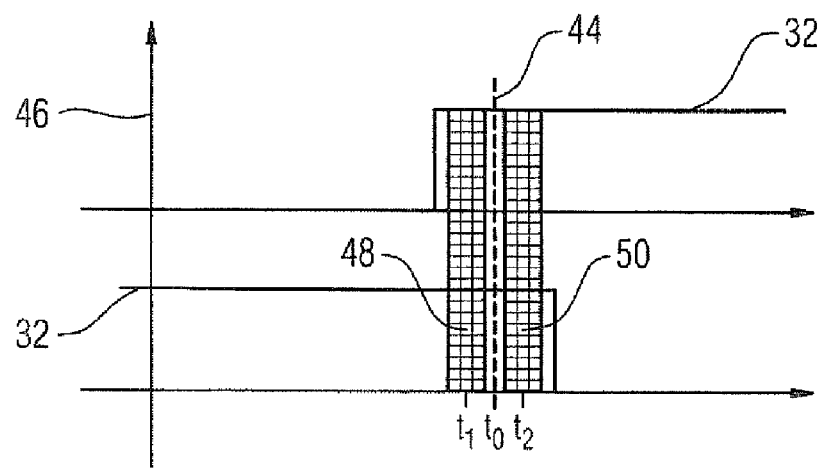
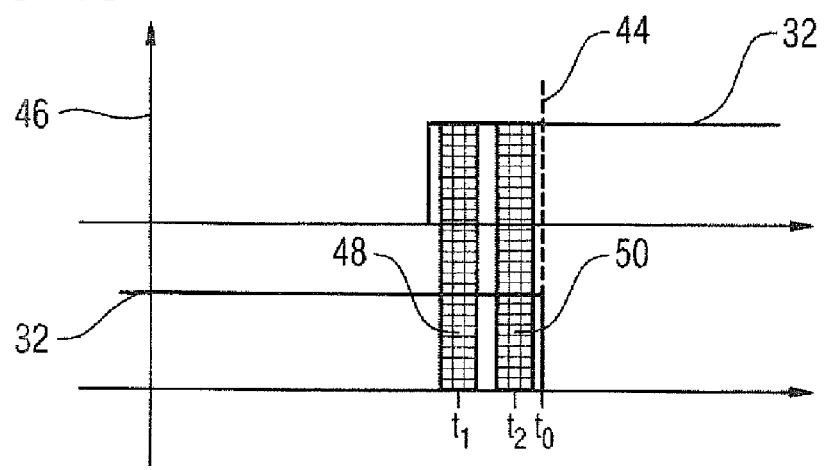
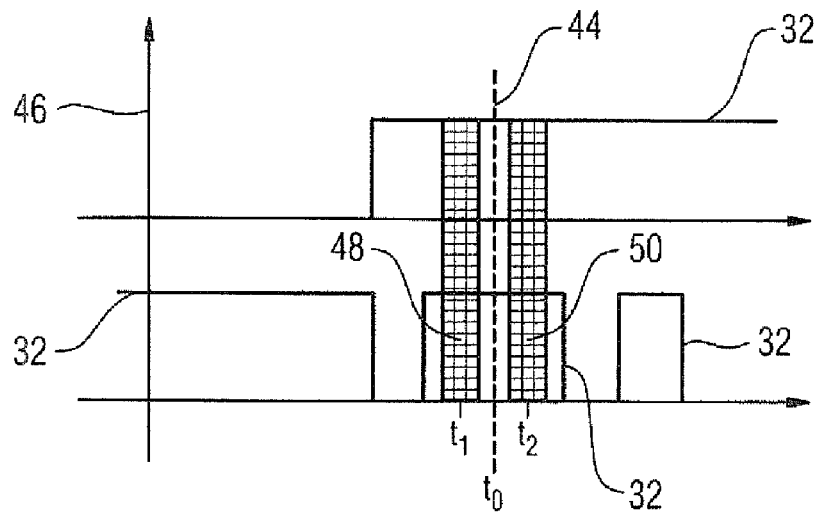

METHOD FOR OPERATING A CONVERTER AND CORRESPONDING APPARATUS

CROSS-REFERENCES TO RELATED APPLICATIONS

This application claims the priority of European Patent Application, Serial No. EP 08012314, filed Jul. 8, 2008, pursuant to 35 U.S.C. 119(a)-(d), the content of which is incorporated herein by reference in its entirety as if fully set forth herein.

BACKGROUND OF THE INVENTION

The present invention relates to a method for operating a fundamental frequency clocked converter on the power supply side comprising a bridge circuit equipped with controllable semiconductor switches, and to an apparatus provided for implementing the method, that is to say a converter device comprising a converter of this type and a bridge circuit of this type.

The following discussion of related art is provided to assist the reader in understanding the advantages of the invention, and is not to be construed as an admission that this related art is prior art to this invention.

A converter device or a converter circuit has at least one power supply connection and phase sections which are provided therefor as power supply connection and function as current paths, in other words three phase sections in the case of connection to a three-phase power supply, then the actual converter with the bridge circuit that implements the conversion functionality, and an DC link circuit at the output of the converter, wherein a first output of the converter forms a first DC link circuit contact and a second output of the converter forms a second DC link circuit contact. An DC link voltage is present between these two DC link circuit contacts during operation, said DC link voltage arising as a DC voltage on account of the conversion. For the purpose of buffering and smoothing the DC link circuit voltage, an DC link circuit capacitance is usually arranged between the DC link circuit contacts.

In the case of a positive power flow arising during operation into the intermediate circuit, the converter operates approximately like a so-called B6 diode bridge, since only the diodes of the converter carry the current, while transistors that are respectively reverse-connected in parallel therewith as semiconductor switches are deenergized. Conversely, in the case of power flow from the DC link circuit into the power supply, the diodes are reverse-biased and precisely one path into the power supply is made possible for the current by corresponding activation of individual transistors at each point in time. One preferred circuit for the bridge circuit forming the converter is a so-called IGBT (insulated gate bipolar transistor) B6 bridge, which has a passive parallel diode bridge that enables purely passive operation in one power direction, that is to say e.g. for the power flow into the intermediate circuit, and an active feed-in/feedback power flow, that is to say correspondingly e.g. from the DC link circuit into the power supply. In fundamental frequency operation, switching edges for driving the transistors, which are referred to hereinafter generally as semiconductor switches, are at so-called natural triggering instants, that is to say intersection points of the power supply voltages which are fed to the circuit or to the device via the individual current paths, that is to say, in the case of a three-phase power supply, the individual lines—designated hereinafter by R, S, T—of the three-phase power supply with the power supply voltages $U_R$, $U_S$ and $U_T$ fed by means thereof.

Fundamental frequency clocked operation of converters is distinguished by some advantages that make it expedient to use. Since the semiconductor switches, which can also be referred to as current valves, are not clocked at high frequency, this results for example in low switching losses and furthermore in the possibility of using simple and cost-effective commutation inductors and power supply filters, and finally in low excitation of system oscillations that can lead e.g. to high motor bearing currents. Finally, the operation of converters of this type is generally robust with respect to power supply disturbances, power supply unbalances and the like.

On account of the properties mentioned, fundamental frequency clocked converters are suitable in particular in areas of application in which cost-effective solutions are sought and high cost pressure prevails. Therefore, there is a particular demand for cost reducing measures. In this regard, changes to construction or circuit are particularly effective since they take effect in production for each individual device and thereby enable large savings in total.

As already described, the switching edges of the semiconductor switches during fundamental frequency operation are at the natural triggering instants defined by the intersection points of the power supply voltages. Therefore, knowledge of the power supply phase angle is necessary for the correct driving of the semiconductor switches. For this purpose, measurement methods proposed to date are comparatively complicated and include, e.g., an evaluation of a voltage between lines in the converter or a detection of the instant of a change in sign of these voltages with the aid of a comparator circuit. The measuring devices required for such measurements are not necessary either for the actual converter function or for the protection of the converter and could be omitted in this respect if it were possible to implement a different solution for determining the power supply phase angle.

It is an object of the present invention, therefore, to specify a novel, in which method in particular the circuitry outlay for a metrological detection is intended to be minimized, in particular is intended to be obviated, while measurement variables, specifically measurement variables which relate to the phase currents and which are also required for device protection, are intended to be used.

It would therefore be desirable and advantageous to obviate prior art shortcomings by providing an improved method for determining the power supply phase angle for instances of fundamental frequency clocked feed-in/feedback and to thereby reduce the measurement complexity.

SUMMARY OF THE INVENTION

This object is attained by using measured quantities that relate to the phase currents which are already required for device protection.

According to one aspect of the present invention, a method for operating a line-side fundamental-frequency-clocked converter having a bridge circuit equipped with controllable semiconductor switches arranged as upper and lower semiconductor switches, wherein the upper semiconductor switches are connected to a first DC link terminal operating at a first DC link potential, and the lower semiconductor switches are connected to a second DC link terminal operating at a second DC link potential, includes the steps of simultaneously activating two upper or two lower semiconductor switches during fundamental frequency operation for a predetermined time period before or after a natural trigger instant of the semiconductor switches caused by a line voltage angle, and while the two upper or two lower semiconductor switches are simultaneously active, measuring two phase currents and, based on the two measured phase currents, tracking an estimated line voltage angle for clocking the semiconductor switches.

The designation of individual semiconductor switches of the bridge circuit as upper or lower semiconductor switches is introduced only for the purpose of differentiation. The upper semiconductor switches, three upper semiconductor switches for a three-phase line voltage, are connected to a first DC link terminal representing the first DC link potential, whereas the lower semiconductor switches, likewise three lower semiconductor switches for a three-phase line voltage, are connected to a second DC link terminal representing the second DC link potential during operation of the converter.

Simultaneous activation of at least two semiconductor switches means that at least one additional semiconductor switch is activated alongside the semiconductor switch that is normally active on account of the fundamental frequency clocking. Advantageously, an electric mesh and hence a closed electric circuit is formed by the simultaneous activation of two upper or lower semiconductor switches of the bridge circuit and in conjunction with the diodes reverse-connected in parallel. Regarding these electric circuit, it is possible to carry out measurements, in particular current measurements, the result of which can be used for tracking the power supply angle.

If the simultaneously activated upper or lower semiconductor switches are those semiconductor switches between which a switchover is effected during fundamental frequency operation, this advantageously has the effect that in the region of a sector limit for the switchover during fundamental frequency operation, that voltage between lines is small between whose phases a switchover is intended to be effected; in the case of a three-phase power supply, the voltage of the respective third phase is then in the region of its maximum and changes only relatively slowly. For determining the phase angle, that is to say for tracking the estimated power supply angle, it is therefore approximately sufficient to solely consider the mesh short-circuited by the simultaneous activation of the upper or lower semiconductor switches.

If one lower semiconductor switch is permanently active alongside two upper semiconductor switches that are at least momentarily activated simultaneously, and one upper semiconductor switch is permanently active alongside two lower semiconductor switches that are at least momentarily activated simultaneously, the fundamental frequency operation of the converter is not impaired by the measurements for tracking the estimated power supply angle.

In one embodiment, each semiconductor switch of the upper semiconductor switches is connected to a corresponding lower semiconductor switch at a center tap, with each center tap connected to a different phase of the line voltage in one-to-one correspondence Advantageously, the estimated power supply angle may be tracked based on a total voltage in the phases connected by the simultaneously activated semiconductor switches. Via the respectively simultaneously driven semiconductor switches, therefore, the phase sections respectively connected thereto are interconnected to form a mesh and in the latter the total voltage that arises is the sum of a line voltage between the two meshed phase sections plus the voltage dropped along the respective phase section, i.e., the voltage dropped across the commutation inductor that is part of the phase section. If saturation effects, e.g. saturation effects of the commutation inductor(s), are disregarded in favor of a simple representation, a peak value of the power supply voltages between lines is approximately known on the basis of an average DC link voltage present between the first and second DC link circuit contacts. From this it is possible to obtain an estimated value for the connection voltage at the point in time of the measurements to be carried out, wherein the present estimated value for the power supply frequency is taken as a basis. It is thus possible to determine a deviation from the estimated voltage value, which deviation can be positive or negative and is a measure of whether the switched-on operation was to early or too late in comparison with the actual sector boundary, that is say in comparison with the real power supply angle. This deviation can accordingly be used as an input value for a phase locked loop (PLL) in order to increase or decrease the estimated value for the power supply frequency. The tracking of the estimated power supply angle can therefore be effected either linearly with a correction value formed on the basis of a total voltage or in discrete steps on the basis of a sign of the total voltage or a correction value formed therefrom.

According to another aspect of the invention, a converter device includes a line-side fundamental-frequency-clocked converter having a bridge circuit equipped with controllable semiconductor switches arranged as upper and lower semiconductor switches, wherein the upper semiconductor switches are connected to a first DC link terminal operating at a first DC link potential, and the lower semiconductor switches are connected to a second DC link terminal operating at a second DC link potential. The converter device further includes means for simultaneously activating two upper or lower semiconductor switches during fundamental frequency operation for a predetermined time period before or after a natural trigger instant of the semiconductor switches caused by a line voltage angle, means for simultaneously measuring two phase currents while the two upper or two lower semiconductor switches are simultaneously active, and means for determining tracking of an estimated power supply angle for clocking of the semiconductor switches based on the two measured phase currents.

In this case, the simultaneous activation of two upper or lower semiconductor switches is initiated during a predetermined, not necessarily interruption-free time period before and/or after natural triggering instants—arising on the basis of a power supply angle—of the semiconductor switches during fundamental frequency operation.

The advantage of such a configuration of the converter device has similar advantages as those provided by the method according to the invention. In this respect, reference is made to the discussions above.

Advantageously, a selectable plurality of patterns for simultaneously activating two upper or lower semiconductor switches may be stored as test signals in a memory for the means provided for simultaneously activating two upper or lower semiconductor switches. Different signal shapes can thus be selected and employed for the simultaneous activation of two lower and upper semiconductor switches to provide favorable operating conditions.

The method outlined further above and explained in greater detail below is preferably implemented in software and/or firmware (microcode according to VHDL or the like in FPGA, ASIC or the like), such that the invention also relates to a computer program comprising program code instructions or microcode instructions executable by a computer. In this respect, the invention then also relates to a storage medium comprising such a computer program executable by a computer, and to a converter device on which such a computer program is loaded. Finally, the invention thus also relates to a converter device comprising a processing unit in the manner of a processor or the like as means for simultaneously activating two upper or lower semiconductor switches, and as means for carrying out two measurements during the simultaneous activity of two upper or lower semiconductor switches and also as means for deriving a tracking of an estimated power supply angle for the clocking of the semiconductor switches on the basis of the measurements, wherein a computer program as outlined above is loaded on the processing unit, and/or wherein the processing unit is intended and provided for executing such a computer program.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows an illustration for elucidating a control logic of the semiconductor switches, FIG. 9 to FIG. 14 show schematically simplified illustrations of test signals for measurements in the mesh that arises on account of an instantaneous activation of individual semiconductor switches, for deriving a tracking of an estimated power supply angle for the clocking of the semiconductor switches.

DETAILED DESCRIPTION OF PREFERRED EMBODIMENTS

Figure 1:
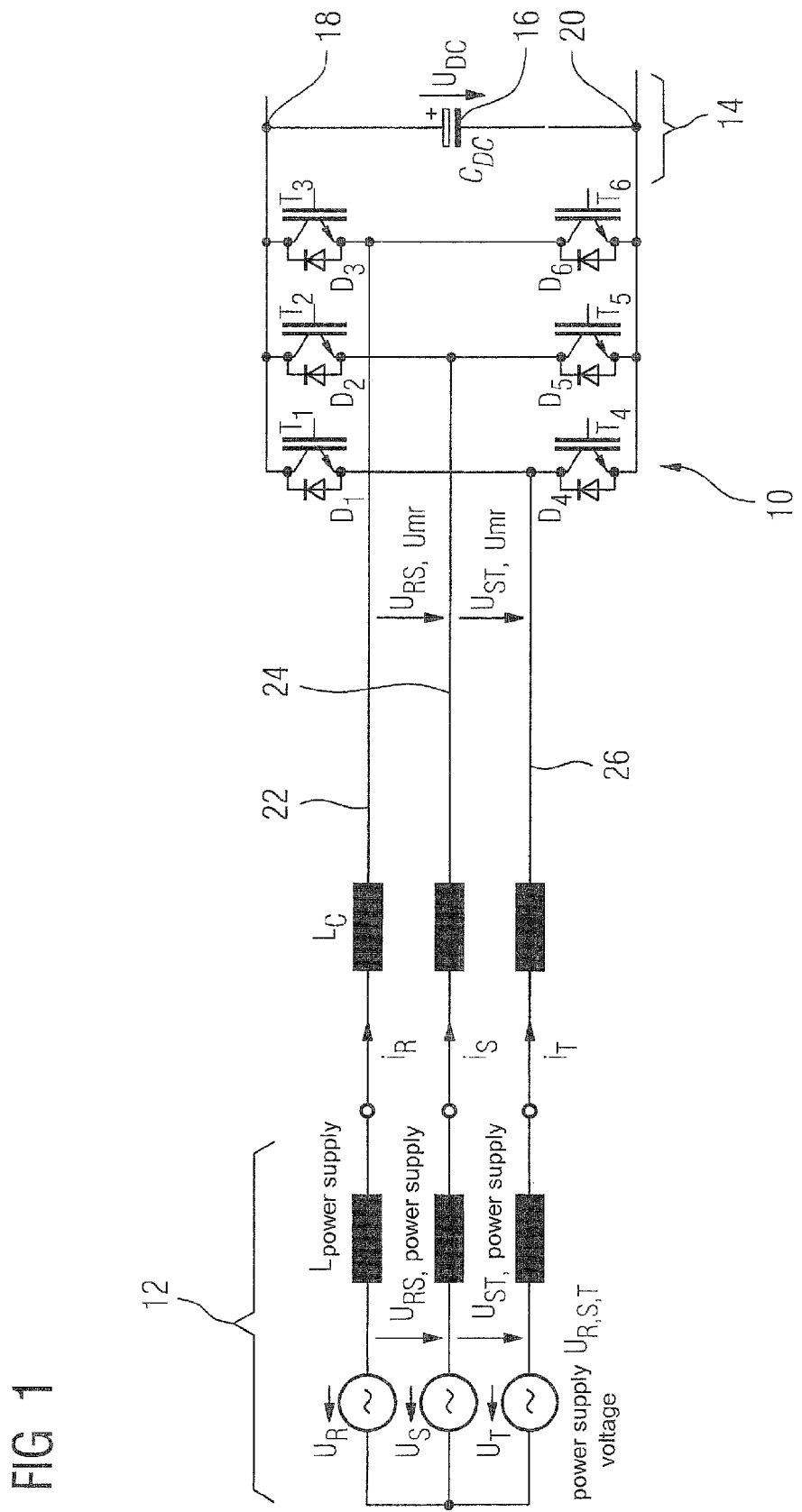
FIG. 1 shows a converter comprising a bridge circuit comprising semiconductor switches on a three-phase power supply.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematically simplified manner, the connection and the construction of a converter 10 on a three-phase power supply 12, wherein the converter 10 comprises a bridge circuit equipped with controllable semiconductor switches T1, T2, T3, T4, T5, T6 and diodes D1, D2, D3, D4, D5, D6 reverse-connected in parallel, in particular in an embodiment as an IGBT B6 bridge.

An DC link circuit 14 is disposed downstream of the converter 10 at the output thereof, said DC link circuit comprising an DC link circuit capacitance 16, across which an DC link voltage $u_{DC}$ is dropped during operation. The DC link circuit capacitance 16 is also designated as $C_{DC}$ in accordance with conventional circuit element designations. From the converter 10, a number of upper semiconductor switches T1-T3, exactly three upper semiconductor switches T1-T3 in the case illustrated, are connected to a first DC link circuit contact 18, which is at a first DC link circuit potential during operation of the converter 10. A number of lower semiconductor switches T4-T6, exactly three lower semiconductor switches T4-T6 in the case illustrated, are correspondingly connected to a second DC link circuit contact 20, which is at a second DC link circuit potential during operation of the converter 10. The DC link circuit capacitor 16 is connected between the first and second DC link circuit contacts 18, 20 and the potential difference between the potentials present at said contacts 18, 20 corresponds to the DC link voltage $u_{DC}$.

On the input side, the converter 10 is connected to the power supply 12, to be precise via phase sections 22, 24, 26 on the power supply side, to be precise in such a way that each phase section 22-26 is connected to a center tap between respectively an upper and a lower semiconductor switch T1-T6. Each phase section 22-26 comprises a commutation inductor $L_C$ and a current $i_R$, $i_S$, $i_T$ determined by the power supply voltages $u_R$, $u_S$, $u_T$ flows in each phase section 22-26. For the feeding power supply 12, a power supply inductance $L_{power\ supply}$ is respectively shown for each phase R, S, T.

Switching edges for driving the semiconductor switches T1-T6, for fundamental frequency operation, are at so-called natural triggering instants, namely the intersection points of the sinusoidal power supply voltages $u_R$, $u_S$, $u_T$ or the zero crossings of the voltages between lines $u_{RS}$, $u_{ST}$ and $u_{TR}$.

In this respect, FIG. 2 illustrates a power supply period of 0°-360° in a schematically simplified manner for elucidating a control logic of the semiconductor switches T1-T6 in fundamental frequency operation, wherein the illustration on the left-hand side of FIG. 2 is referred to hereinafter as sector diagram and a switchover (commutation) between two semiconductor switches T1-T6 respectively takes place at sector boundaries depicted in said diagram (at 0°, 60°, 120°, 180°, 240°, 300°), e.g. between the semiconductor switches designated by T5 and T6 at the sector boundary at 0°. In the case of positive power flow in the DC link circuit 14, the converter 10 operates approximately like a B6 diode bridge, since the diodes D1-D6 carry the current and the semiconductor switches T1-T6 that are respectively reverse-connected in parallel therewith are deenergized. In the case of power flow from the DC link circuit 14 into the power supply 12, the diodes D1-D6 are reverse-biased and precisely one path via respectively active semiconductor switches T1-T6 into the power supply 12 is made possible for the current at each point in time.

This operating mode outlined (power flow into or from the DC link circuit 14) is distinguished by some advantages that make it expedient to use such a converter 10. Since the semiconductor switches T1-T6 functioning as current valves are not clocked at high frequency, this results for example in lower switching losses, simple and cost-effective commutation inductors $L_C$ and power supply filters, and lower excitation of system oscillations that can lead e.g. to high motor bearing currents, and finally robust operation in the event of power supply disturbances, power supply unbalances and the like. On account of the properties mentioned, such fundamental frequency clocked converters 10 are suitable especially for applications where cost-effective solutions are sought and high cost pressure prevails. Therefore, there is a particular demand for cost reducing measures here. Corresponding changes to construction or circuit are effective since they take effect in production for each individual device and in total enable large savings as a result.

As emerges from FIG. 2, knowledge of the phase angle of the power supply 12 (power supply phase angle) is necessary for the correct driving of the semiconductor switches T1-T6. While the power supply phase angle can be determined by measurement on the basis of additional measuring devices, the invention proposes a method for determining the power supply phase angle and an apparatus which operates according to the method and which, alongside measuring devices that are already essential for the actual converter function or converter protection, does not comprise further measuring devices provided exclusively for the determination of the phase angle.

For simpler mathematical description of the power supply phase angle of a three-phase system as illustrated in FIG. 1 (three phase sections 22-26), the temporal instantaneous values of the phase section variables $x_1$, $x_2$, $x_3$ are combined to form a complex space vector X $$x = \frac{2}{3}(x_1 + ax_2 + a^2 x_3)$$

where $a = e^{j\frac{2\pi}{3}}$

The zero component is not taken into consideration here. For the real Cartesian coordinates $x_\alpha$ and $x_\beta$ of the space vector $X_{\alpha\beta} = x_\alpha + j x_\beta$, the following transformation specification holds true:

$$\begin{bmatrix} x_\alpha \\ x_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} x_1 \\ x_2 \\ x_3 \end{bmatrix}.$$

The following is obtained for the voltage space vector:

$$\begin{bmatrix} u_\alpha \\ u_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} u_R \\ u_S \\ u_T \end{bmatrix} = \begin{bmatrix} \frac{2}{3} & \frac{1}{3} \\ 0 & \frac{1}{\sqrt{3}} \end{bmatrix} \cdot \begin{bmatrix} u_{RS} \\ u_{ST} \end{bmatrix}$$

where $u_{RS} = u_R - u_S$, $u_S$, $u_{ST} = u_S - u_T$.

The angle of this voltage vector, that is to say the power supply angle or the phase angle, is defined in accordance with FIG. 2 as $$\phi = \arctan\left(\frac{u_\beta}{u_\alpha}\right).$$

The fundamental in the first phase thus precisely obtains its maximum at $\phi = 0$.

The determination of the power supply phase angle during operation is based to date on a direct measurement of the power supply voltage, e.g. by measuring at least two voltages between lines at the converter terminals, and in this respect requires an A/D converter, a $\Sigma\Delta$ converter or the like, or by detecting a sign change of the voltages between lines by means of a special comparator circuit, or by measuring at least two voltages between lines on the power supply side of the commutation inductor, which in turn requires e.g. a separate measuring module with A/D converter at the power supply connection point.

In the case of a direct measurement of the voltages, the present power supply angle can be calculated directly therefrom by means of suitable transformation. This instantaneous value can be fed as input value to a PLL operating with an estimated value for the power supply angle, in order to track the power supply frequency or a PLL estimated value of the power supply angle. If e.g. only the zero crossings of the power supply voltages are detected, then the power supply angle is known in each case precisely at the instant of a zero crossing. The power supply angle can simply be interpolated between the instants of the voltage zero crossings. The interpolation value is used as input value of a power supply PLL (also see 2005E18911 DE), in order to obtain a filtered continuous estimated value of the power supply frequency.

The invention proposes replacing the hitherto required device for detecting the power supply voltage by a combination of an additional pattern, or pattern modified relative to the standard, for driving the semiconductor switches T1-T6, which are compatible with fundamental frequency clocking, wherein, during a predetermined or predeterminable, not necessarily interruption-free time period before and/or after natural triggering instants—arising on account of a power supply angle—of the semiconductor switches T1-T6 during fundamental frequency operation, two upper or lower semiconductor switches T1-T3; T5-T6 are activated simultaneously, phase current measurements of $i_R$, $i_S$, $i_T$ during the simultaneous activation of two lower or upper semiconductor switches T1-T3; T4-T6, and a model calculation for determining the estimation error as a deviation between the instantaneous estimated value for the power supply angle and the actual power supply angle.

In the case of the normal fundamental frequency clocking according to FIG. 2, at each point in time only one transistor T1-T3 of the upper bridge half, that is to say only one upper semiconductor switch T1-T3, and one transistor T4-T6 of the lower bridge half, that is to say only one lower semiconductor switch T4-T6, are activated. By contrast, what is characteristic of the changed control logic proposed here is that two upper or lower semiconductor switches T1-T3; T5-T6 are activated for short times. The estimated error that can be determined on the basis of the model calculation can finally be used as an input value of a frequency estimator (preferably a PLL) for tracking power supply frequency and phase angle.

Figure 3:
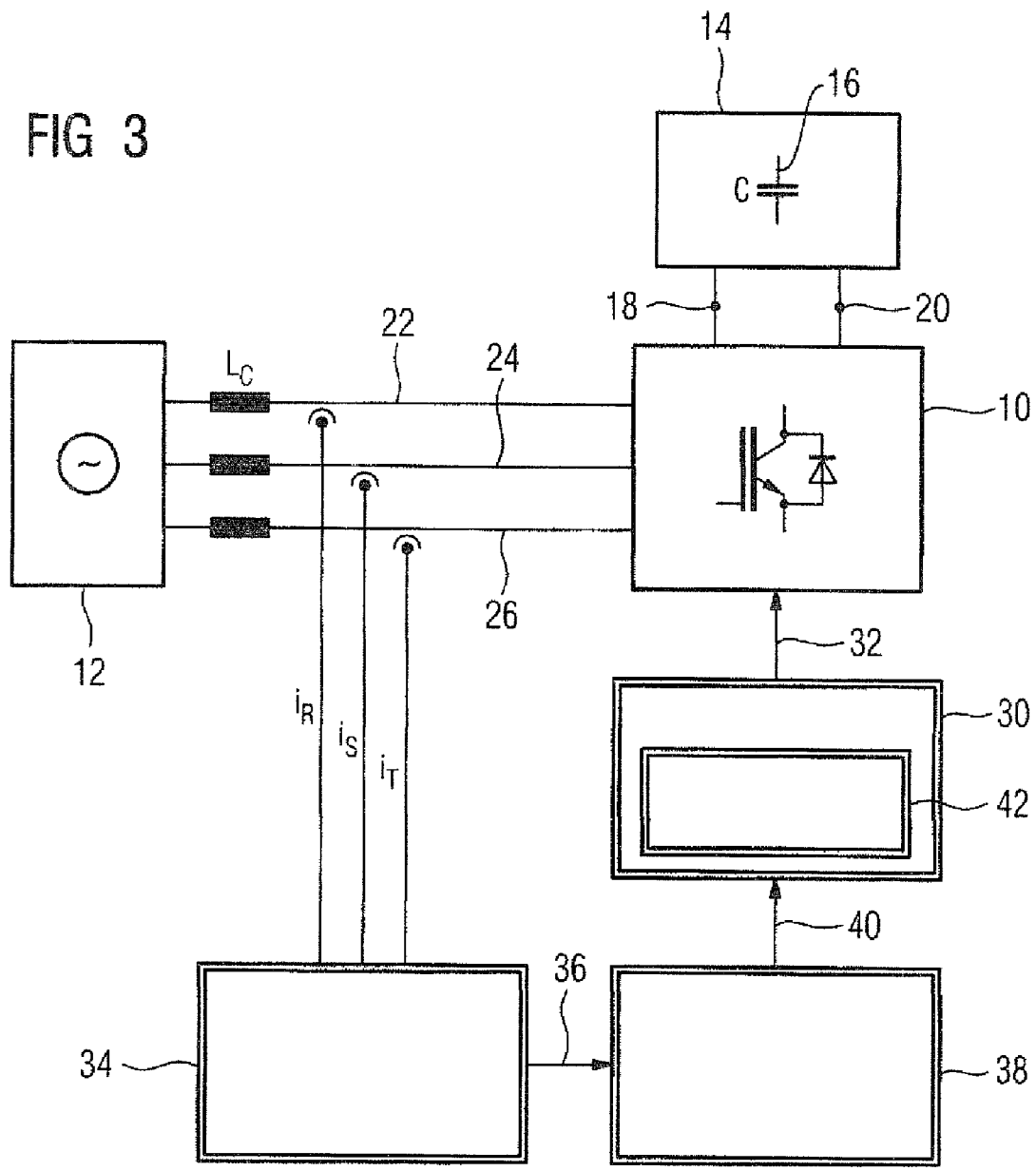
FIG. 3 shows a block diagram for a model-aided determination of the power supply phase angle.

FIG. 3 shows in this respect a schematically simplified block diagram of a converter device configured according to the invention for a model-aided determination of the power supply phase angle. This diagram shows, also cf. FIG. 1, the power supply 12, the commutation inductors $L_C$, the converter 10 and the DC link circuit 14 comprising the DC link circuit capacitance 16, and also the converter 10 arranged between power supply 12 and DC link circuit 14.

In addition, means designated as activation means 30 hereinafter for differentiation purposes are provided on the one hand for activating the semiconductor switches T1-T6 in accordance with fundamental frequency operation, that is to say at the natural triggering instants, and on the other hand for simultaneously activating two upper or lower semiconductor switches T1-T3; T5-T6 of the converter 10. In this case, the activation of the semiconductor switches T1-T3; T5-T6 is effected by means of activation signals 32. The simultaneous activation is effected during a predetermined or predeterminable time period before and/or after natural triggering instants—arising on account of a power supply angle—of the semiconductor switches T1-T6 during fundamental frequency operation.

Furthermore, means referred to hereinafter as measuring means 34 for differentiation purposes are provided for carrying out two measurements during the simultaneous activity of two upper or lower semiconductor switches T1-T3; T5-T6. The one or more measuring means 34 perform the measurement of the phase currents $i_R$, $i_S$, $i_T$ and, on this basis, a model-aided assessment of changes in the measured currents at the instant of suitable switching signals. The one or more measuring means 34 supply as output an estimation error 36, which is fed to a frequency estimator (model) 38 as means for deriving a tracking of an estimated power supply angle 40. The tracking is effected on the basis of the measurements effected by the one or more measuring means 34 and the estimated power supply angle 40 that is tracked in this way, that is to say corrected, if appropriate, is used for the clocking of the semiconductor switches T1-T6 and for this purpose is used in the activation means 30 and an adapting means 42 therein for tracking a previous estimated power supply angle for driving the semiconductor switches T1-T6. The estimation error 36 thus serves as an input signal for the frequency estimator 38 (preferably implemented as a PLL) functioning as a model and an output signal generated by the frequency estimator 38 is used as an estimated power supply angle 40 for tracking power supply frequency and phase angle (power supply phase angle). Measuring means 34, model 38 and activation means 30 are preferably implemented in software and/or firmware. Appropriate measuring means 34, model 38 and activation means 30 correspondingly also include a processor, ASIC, FPGA or the like (not illustrated separately), which execute such software or firmware.

Figure 4:
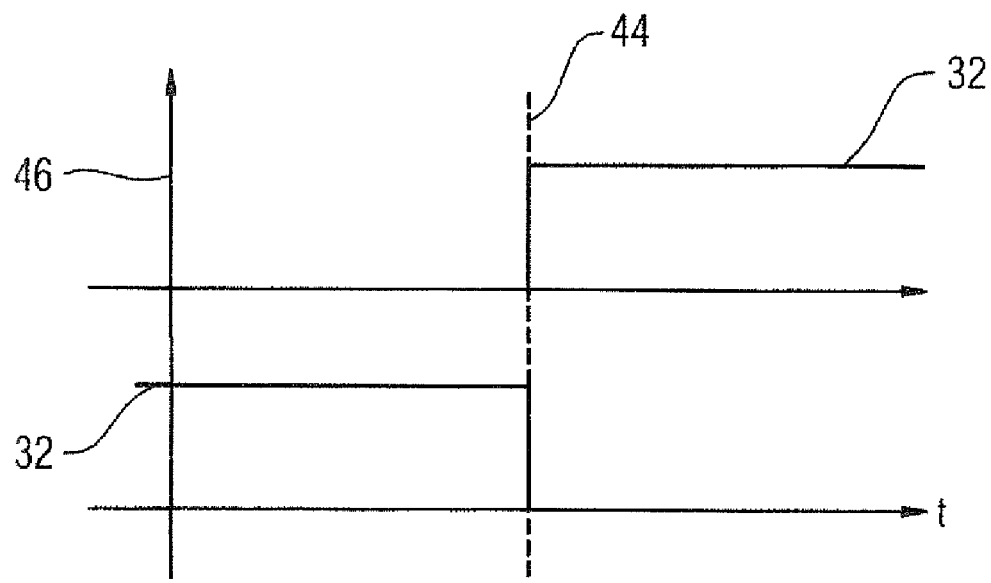
FIG. 4 shows drive signals for activating the semiconductor switches in accordance with fundamental frequency clocking.

The approach according to the invention as outlined above is explained in greater detail below on the basis of an example: the method shall firstly be explained using the example of the commutation process upon the transition from the activation firstly of the semiconductor switch designated as T1 to the activation of the semiconductor switch designated as T2 (T1→T2; corresponding to the sector boundary at 60° in FIG. 2) in the upper bridge branch. The semiconductor switch T6 in the lower branch remains permanently switched on in this time period. The "normal" drive signals 32 (FIG. 3) in accordance with fundamental frequency clocking are illustrated in FIG. 4, wherein the drive signals 32 for driving two semiconductor switches are shown over time t, to be precise for a semiconductor switch to be switched on in an upper illustration and for a semiconductor switch to be switched off in a lower illustration. The switchover is effected at the sector boundary 44 illustrated by a vertical line. In this case, the respective signal for gate driving is plotted over an ordinate 46. The illustration in FIG. 4 shows the situation where e.g. at a power supply angle of 60°, that is to say from the transition from sector I to sector II (cf. FIG. 2), the semiconductor switches designated as T1 and T2 are respectively switched off and on at the same time.

Figure 5:
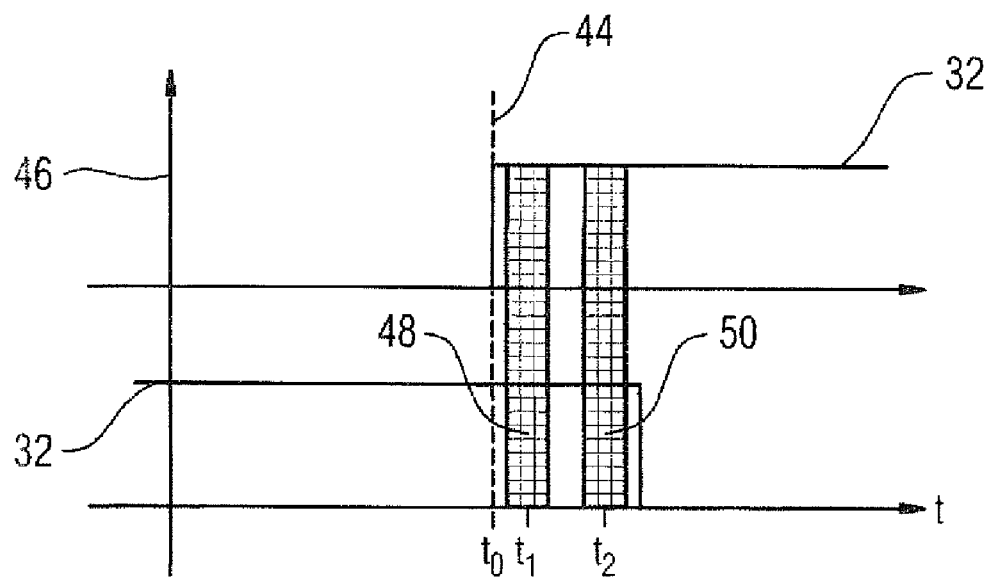
FIG. 5 shows a snapshot in the driving of two semiconductor switches in accordance with the approach of the invention.
Figure 6:
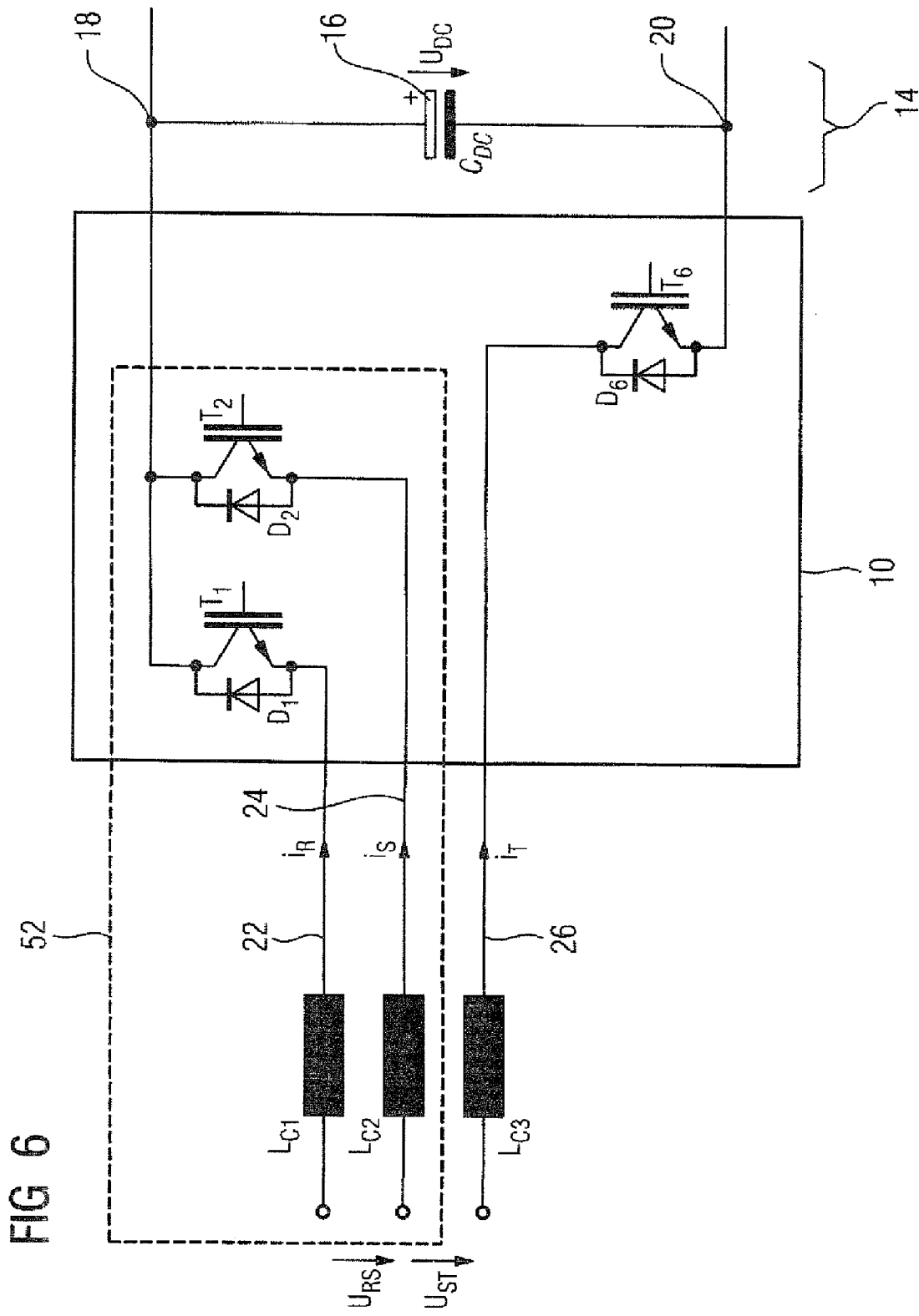
FIG. 6 shows an equivalent circuit diagram of the bridge circuit in accordance with an instantaneous activation of individual semiconductor switches and a resultant electric circuit with a mesh.

In contrast to this, FIG. 5 shows a snapshot in the driving of two semiconductor switches T1-T6 in accordance with the approach of the invention. Two semiconductor switches T1-T6 that are to be switched on and off in accordance with the natural triggering instants are simultaneously active at least for a short time period, to be precise starting from the sector boundary 44 assumed for an instant $t_0$ in the case illustrated. During this simultaneous activity, which is also referred to hereinafter as overlap or overlap phase, two measurements are carried out, the result of which is used for tracking the estimated power supply angle 40 (FIG. 3) for the clocking of the semiconductor switches T1-T6. In this case, a first measurement 48, represented by a hatched region, takes place at an instant $t_1$ during the overlap and a second measurement 50 takes place at an instant $t_2$ during the overlap. The measurements 48, 50 are preferably measurements of the currents of the power supply phases affected by the activation of the respective semiconductor switches T1-T6, that is to say, in the example, $i_R$ and $i_S$ for the semiconductor switches that are designated by T1 and T2 and are respectively to be switched on and off at the sector boundary 44 illustrated. Since, during the overlap phase, two upper semiconductor switches T1-T6 are simultaneously active and the current can flow in both directions in conjunction with the diodes D1-D6 reverse-connected in parallel, the following mesh equation can be established for the measurement instants $t_1$ and $t_2$ $$\frac{d(L_{C1}(i_R) \cdot i_R(t))}{dt} - \frac{d(L_{C2}(i_S) \cdot i_S(t))}{dt} - u_{RS}(t) = 0, \qquad [1]$$

for which FIG. 6 shows the equivalent circuit diagram that arises from simultaneous activation of two upper semiconductor switches T1-T6, namely the transistors T1 and T2, and the activation of at least one lower semiconductor switch T1-T6, namely the transistor T6, with omission of all switching elements in non-active paths. On account of the simultaneous activation of two semiconductor switches T1-T6, here two upper semiconductor switches T1-T3, a mesh 52 results. The measurements that have been outlined above and are explained further below are carried out with regard to the respective mesh 52.

The voltage drops at the semiconductor switches T1-T6 and other parasitic effects were disregarded to an approximation in equation 1, as were the voltage drops across the power supply inductance $L_{power\ supply}$ (cf. FIG. 1). To an approximation it is possible to supplementarily add the power supply inductance to the commutation inductance $L_C$. Saturation effects of the commutation inductor depending on the current may possibly have to be taken into account.

If the measurement instants $t_1$ and $t_2$ are sufficiently close together, then the following can be established with sufficient accuracy:

$$L_{C1} \frac{\Delta i_R}{\Delta t_{21}} - L_{C2} \frac{\Delta i_S}{\Delta t_{21}} - u_{RS}(t_{12}) = 0$$

where $\Delta i_{R/S} = i_{R/S}(t_2) - i_{R/S}(t_1)$ and $t_{12} = \frac{t_1 + t_2}{2}$, $\Delta t_{21} = t_2 - t_1$ for the sake of a simple representation, saturation effects of the inductor are disregarded here ($L_C$=const.). The peak value of the power supply voltage between lines is approximately known on the basis of the average DC link circuit voltage: $\hat{U}_{RS} = \overline{U}_{DC}$. An estimated value for the connection voltage at the instant $t_{12}$ is thus obtained as:

$$u_{RS,desired}(t_{12}) = -\hat{u}_{RS} \sin(2\pi f_{PLL} t_{12})$$

where the present estimated value for the power supply frequency $f_{PLL}$ from the power supply PLL is taken as a basis.

The following then holds true for the deviation $y_{RS}$ from the estimated voltage value:

$$y_{RS} = L_{C1} \frac{\Delta i_R}{\Delta t_{21}} - L_{C2} \frac{\Delta i_S}{\Delta t_{21}} - u_{RS,desired}(t_{12}). \quad [2]$$

This deviation can be positive or negative and is a measure of whether the switch-on operation of the transistor T2 is too early or too late in comparison with the actual sector boundary (or in comparison with the real power supply angle). This signal can accordingly be utilized as an input value of a PLL in order to increase or decrease the estimated value for the power supply frequency.

In the region of a sector boundary, that voltage between lines is small between whose phases a switchover is intended to be effected. The voltage of the respective third phases is then in the region of its maximum and changes only relatively slowly. In the specific example, the voltage $u_T$ across the current path of the switched-on lower semiconductor switch, here of the transistor T6, and of the DC link circuit capacitor 16 thus has an approximately symmetrical effect on the phases R and S. For the determination of the phase angle, it therefore approximately suffices to solely consider the short-circuited mesh 52 by way of $u_{RS}$ (equation 1).

Figure 7:
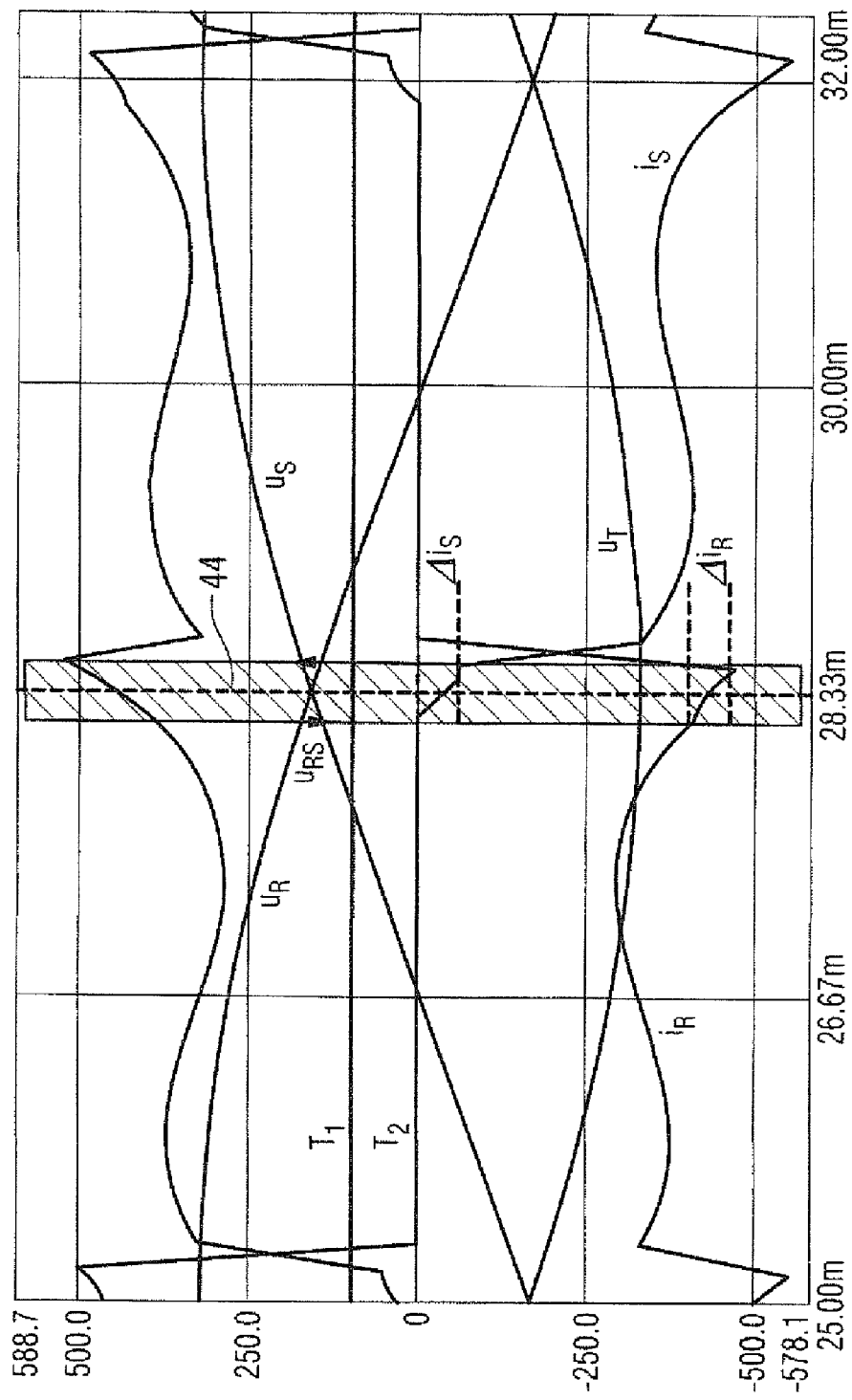
FIG. 7 and FIG. 8 show illustrations of measured values in the case of an exact power supply synchronization and an excessively early commutation, respectively.

The importance of $y_{RS}$ as an error measure for the power supply synchronization can be illustrated particularly easily for the case where the actual sector boundary and the center of the measurement intervals $t_{12}$ coincide, that is to say $u_{RS,desired}(t_{12}) = 0$ and $u_{RS,desired} = u_{RS,desired}$ [3]

and hence $y_{RS}|_{t_{12}=t_0} = L_{C1} \frac{\Delta i_R}{\Delta t_{21}} - L_{C2} \frac{\Delta i_S}{\Delta t_{21}}$ FIG. 7 illustrates the case of an exact power supply synchronization. The current and voltage profiles are shown on the basis of the example of an exactly synchronized switchover from a first upper semiconductor switch to a second upper semiconductor switch, here from the transistor T1 to the transistor T2, symmetrically with respect to the marked sector boundary 44 at $u_R = u_S$ with an overlap of the switch-on times in the hatched region.

The power supply voltage $u_{RS}$ in the mesh 52 considered is identical in magnitude for the first and second current measurements 48, 50; on account of the different signs, the effects on the currents $i_R$, $i_S$ precisely cancel one another out. The currents rise on account of the abovementioned effect of the voltage source in phase T, but in terms of magnitude approximately by the same value $\Delta i_R = \Delta i_S$ on account of the symmetry. For the frequent case $L_{C1} = L_{C2}$, $Y_{RS} = 0$ thus results from equation 3, that is to say that the estimated value of the power supply angle corresponds to the real value.

Figure 8:
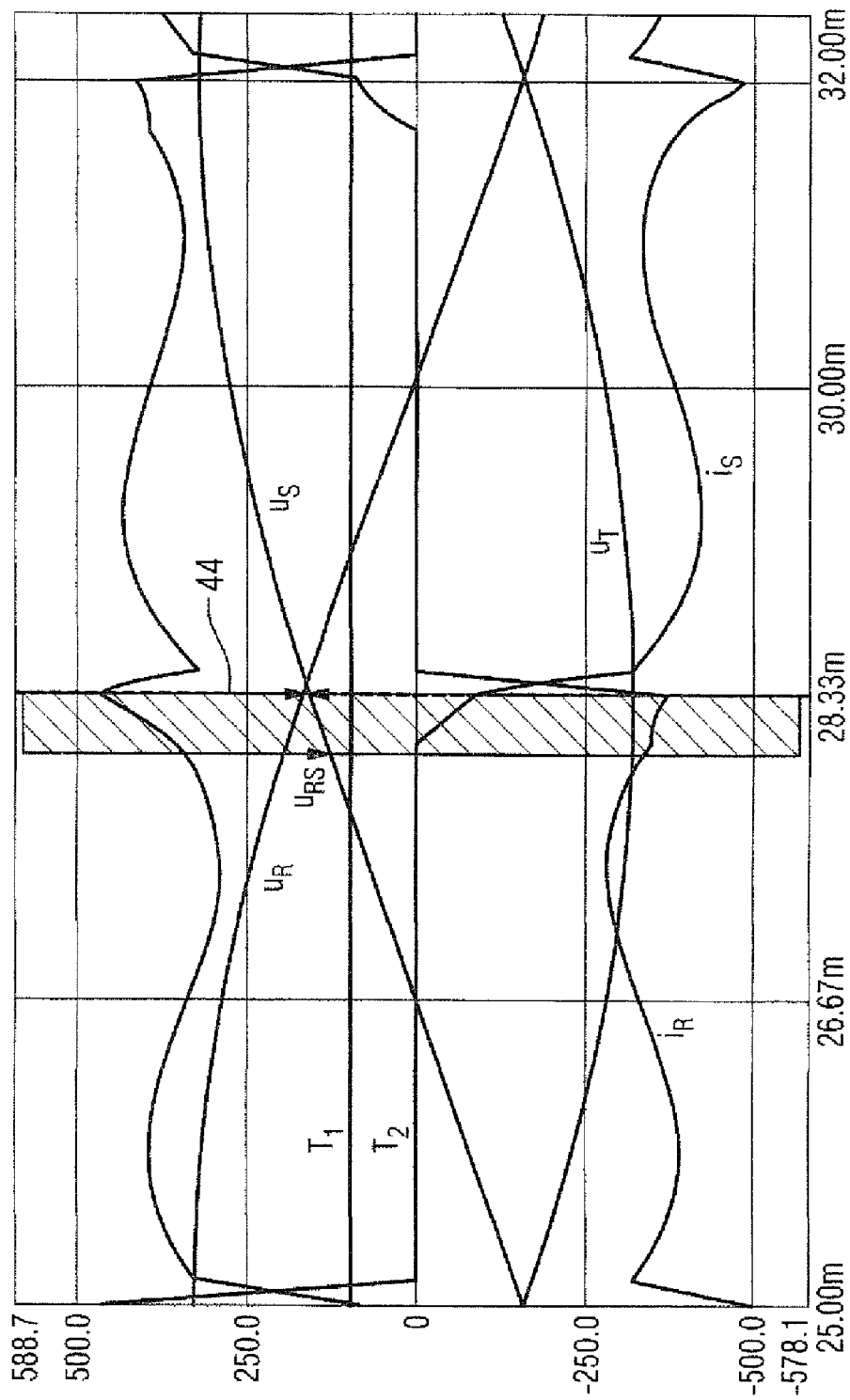

FIG. 8 shows by way of example the case of an excessively early commutation from a first upper semiconductor switch to a second upper semiconductor switch, here from the transistor T1 to the transistor T2, such as would occur for a power supply frequency estimated to be too high. The current and voltage profiles are shown on the basis of the example of a switchover that is excessively early—relative to the marked sector boundary 44—with an overlap of the switch-on times in the hatched region. The effective power supply voltage magnitude $u_{RS}$ at the two measurement instants is no longer identical in magnitude and leads to different current changes of $i_R$ and $i_S$. This results in a $y_{RS} < 0$ as identification of a power supply frequency estimated to be too high in the case of a transistor in the upper bridge half. For the lower bridge half, the significance of the error voltage is inverted and the following table of values results:

| Error value | Transistor switchover in upper bridge half | Transistor switchover in lower bridge half |
|---|---|---|
| y < 0 | Estimated frequency value too high<br>Correction value: +y | Estimated frequency value too low<br>Correction value: −y |
| y > 0 | Estimated frequency value too low<br>Correction value: −y | Estimated frequency value too high<br>Correction value: +y |

The error voltages y are determined upon each sector change and thus six times per power supply period. In order to achieve a stable and robust estimation of power supply frequency and angle with the aid of a PLL, the error values can also be filtered. It may also be expedient to define a tolerance band of permissible error values in order to compensate for the model inaccuracies. In one preferred embodiment, it is also possible for just the sign information of the error voltage signum(y) to serve as an input value of a discrete frequency estimator 38 (FIG. 3). The estimated frequency value in the frequency estimator 38 would accordingly be increased or decreased in stepwise fashion and be used for the switchover at the next sector boundary.

The method can be configured in different ways. The following method steps are characteristic of the configurations, which can in part also be combined among one another:

First Configuration

The normal driving of the semiconductor switches T1-T6 for fundamental frequency clocking (FIG. 2) is extended in such a way that occasionally at least two switches of a half-bridge, that is to say two upper or lower semiconductor switches T1-T3; T5-T6, are simultaneously activated, that is to say closed. During an overlap phase that arises on account of the simultaneous activation, current changes in the affected power supply phases are measured, e.g. by means of at least two successive current measurements. By evaluating the mesh equations (voltage drops across the crucial inductances) in the affected phases, a measure that indicates a quality criterion for the desired position of the switching action with respect to the present actual power supply phase angle is calculated. The quality measure serves as an input signal or correction value for a frequency estimator 38 for power supply frequency/power supply angle (preferably a PLL). The power supply angle 40 calculated by the frequency estimator 38 is used for the generation of the activation signals 32 and for the generation of the abovementioned supplementation signals (simultaneous closing of a plurality of switches of a half-bridge). By virtue of the closed control loop for the model-aided tracking of the power supply angle 40, it is possible to dispense with measurement detections (A/D converters, comparators, etc.) for the direct determination of the power supply voltage or the sign changes of the power supply voltages.

Second Configuration

The changes with respect to the normal fundamental frequency activation signals 32—referred to as test signals hereinafter—are explained as follows:
  the test signals are chosen to be as short as possible in order to permit a reliable measurement of the current changes (e.g. 100 μs);

the test signals are put into the region of the sector boundaries 44 or into the region of the zero crossings of the voltages between lines and thus implemented six times per power supply period in a three-phase system;

preferably, those two lower or upper semiconductor switches T1-T3; T4-T6 which participate in the current commutation in the region of the respective sector boundary 44 are driven simultaneously for the test signal (FIG. 4). This then results in the smallest effect of the test signals on regular operation (power supply perturbations, current harmonics, power reduction) and the evaluation is the simplest and most accurate on account of permissible simplifications (small influence of the model parameters of power supply voltage and inductance, such that parameter inaccuracies do not lead to large estimation errors).

Symmetrical position of the test signal with respect to the sector boundaries 44 as illustrated in FIG. 9. This is a preferred embodiment for achieving low sensitivity to parameter fluctuations.

Test signal before sector boundary as illustrated in FIG. 10. This is a preferred embodiment for achieving an exact commutation at the sector boundary 44.

Test signal with, if appropriate, multiple interruption of the drive block as illustrated in FIG. 11. This is a preferred embodiment which can be used to choose test signals in such a way as to achieve a reduction of the power supply perturbations as a result of high rates of current rise in the case of generator operation.

Figure 12:
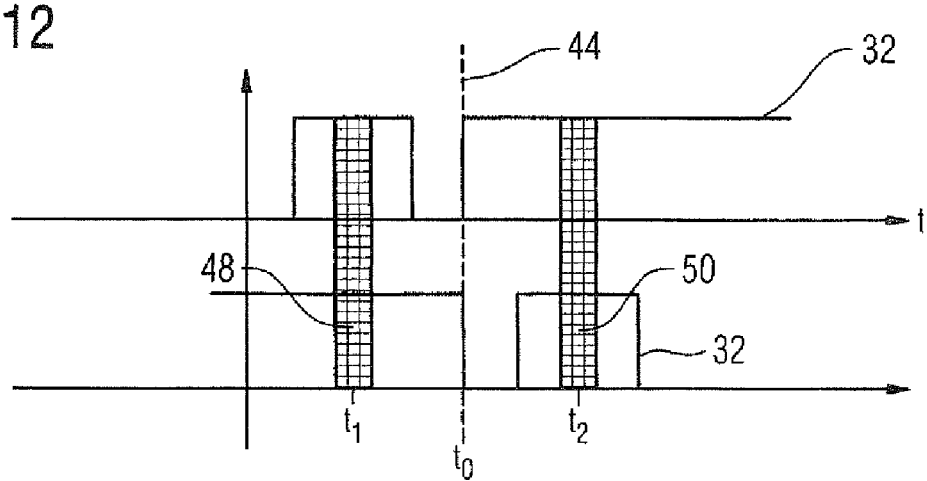

Test signal for measurement instants that are further apart temporally, as illustrated in FIG. 12. This is a preferred embodiment for improving the accuracy of the current difference measurement.

Figure 13:
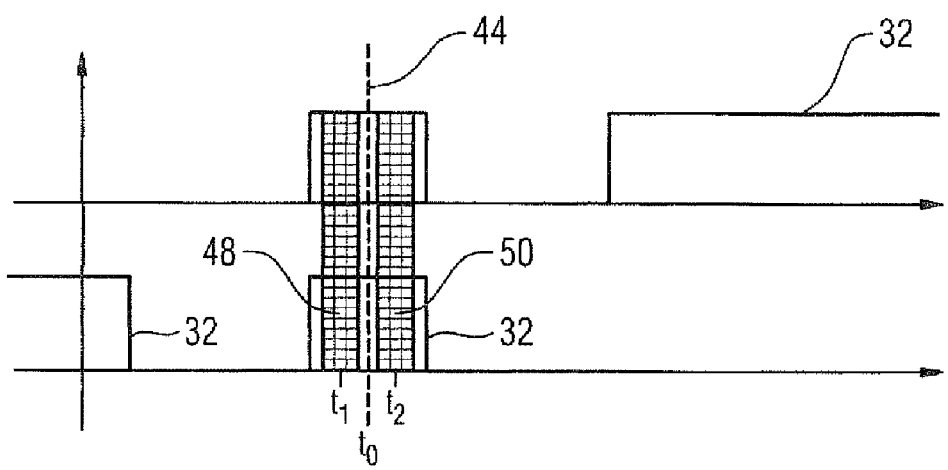
Figure 14:
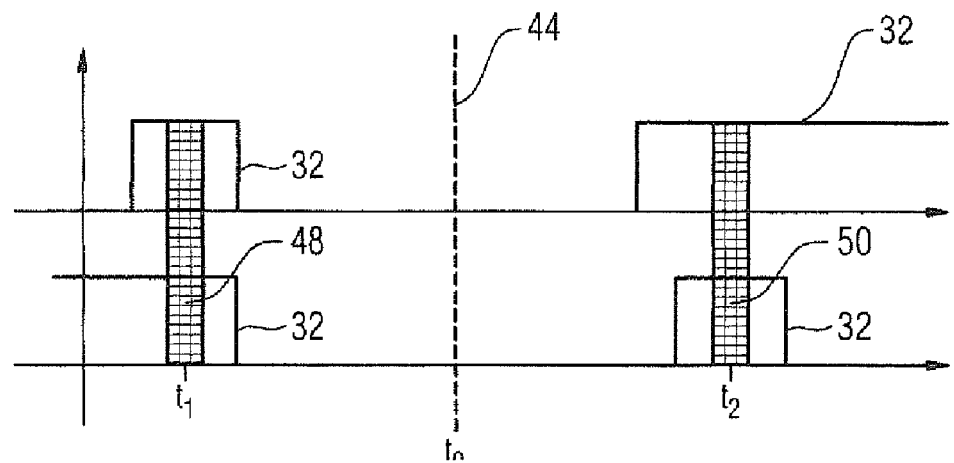

Test signal for reduced drive sectors as illustrated in FIG. 13 or FIG. 14. This is a preferred embodiment for reducing a reactive power in partial load operation and for influencing the feedback power.

Third Configuration

The quality value can be used quantitatively for correcting the estimated frequency value 40 in a frequency estimator 38. Preferably, only the sign (signum function) of the error or of the correction value is used in order to discretely correct the frequency estimation in fixed steps. Preferably, a dead band is used in this case in order to avoid a continuous frequency correction in the case of small deviations from the desired phase angle (two-point characteristic with dead zone).

Fourth Configuration

The current changes in at least two phases must be measurable (measuring device required only in two phases). The current of the third phase $i_3 = i_1 - i_2$ results from Kirchhoff's first law assuming that no or only a small current flows away via a fourth conductor (neutral conductor, ground connection).

Fifth Configuration

In order to improve the model accuracy when calculating the error value y, it is possible to include the mesh 52 via the third phase that is respectively not involved in the switchover process. The following then holds true for the case of the exemplary implementation presented above:

$$\frac{d(L_{C2}(i_S) \cdot i_S(t))}{dt} - \frac{d(L_{C3}(i_T) \cdot i_T(t))}{dt} - u_{ST}(t) + u_{DC}(t) = 0 \quad [4]$$

A further mesh via the power supply voltage $u_{TR}$ and DC link voltage is linearly dependent on the two mesh equations (equations 2 and 4) owing to $u_R + U_S + U_T = 0$. As above, with the aid of equation 4, it is possible to calculate an error value for assessing the actual power supply angle and to use it for increasing the model accuracy (e.g. by averaging with the aid of the quality value from the first mesh equation).

Sixth Configuration

If all three semiconductor switches T1-T6 of a bridge half are closed for the test signals, a so-called zero vector is set. The abovementioned further mesh equation (equation 4) can be established for improving accuracy, in which case the DC link voltage $u_{DC}(t)$ is omitted and therefore does not have to be measured. However, the deviations from the normal current form and the power supply perturbations are larger on account of the momentary short circuits as a result of the zero vectors.

The method described up to now considers the tracking of the estimated power supply angle during ongoing operation, that is to say with the clocking of the semiconductor switches already running. Not described here is how an initial synchronization is effected, that is to say how power supply angle and frequency, before enabling of the activation signals 32, can be determined so accurately that initial errors can be progressively corrected with the method proposed. The initial synchronization is conventionally effected using measurement means, that is to say a measurement of the line voltage profiles or a temporal detection of a plurality of voltage zero crossings. Since these measurement means are intended precisely to be obviated here, it is appropriate, for example, to output short zero vectors before the beginning of the actual fundamental frequency clocking. From the resulting current changes, it is possible to calculate the amplitudes of the power supply voltages and the phase angles thereof and to use them as a set value for the above-described synchronization method during operation, such that a combination of such an initial synchronization with the method described here or one of its configurations or a combination of the configurations is preferably proposed, such that a virtually transient-free transition to ongoing operation is possible as a result of accepting the set values.

For the majority of the test signals described here, or a selection thereof, it is provided that these or underlying patterns are kept in a memory (not illustrated separately) in a computer-readable description in a manner known per se, such that a respective test signal can be selected in accordance with respective boundary conditions and be used for simultaneously activating two upper or lower semiconductor switches T1-T3; T5-T6.

The invention can thus be represented briefly as follows: A specification is given of a method for operating a fundamental frequency clocked converter 10 on the power supply side comprising a bridge circuit equipped with controllable semiconductor switches T1-T6, and an apparatus operating according to the method, wherein a number, in particular three, of upper semiconductor switches T1-T3 are connected to a first DC link circuit contact 18, which is at a first DC link circuit potential during operation of the converter 10, and a number, in particular three, of lower semiconductor switches T4-T6 are connected to a second DC link circuit contact 20, which is at a second DC link circuit potential during operation of the converter 10, wherein, during a predetermined or predeterminable time period before and/or after natural triggering instants—arising on account of a power supply angle—of the semiconductor switches T1-T6 in fundamental frequency operation, two upper or lower semiconductor switches T1-T3; T5-T6 are activated simultaneously, in which method and apparatus, during the simultaneous activity of two upper or lower semiconductor switches T1-T3; T5-T6, two measurements are carried out, the result of which is used for tracking an estimated power supply angle for the clocking of the semiconductor switches T1-T6. With the approach according to the invention, measuring devices required heretofore are obviated or reduced to their minimally required amount.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a line-side fundamental-frequency-clocked converter having a bridge circuit equipped with controllable semiconductor switches arranged as upper and lower semiconductor switches, wherein the upper semiconductor switches are connected to a first DC link terminal operating at a first DC link potential, and the lower semiconductor switches are connected to a second DC link terminal operating at a second DC link potential, the method comprising the steps of:
   simultaneously activating two upper or two lower semiconductor switches during fundamental frequency operation for a predetermined time period before or after a natural trigger instant of the semiconductor switches caused by a line voltage angle,
   while the two upper or two lower semiconductor switches are simultaneously active, measuring two phase currents, and
   based on the two measured phase currents, tracking an estimated line voltage angle for clocking the semiconductor switches.

2. The method as claimed in claim 1, wherein the simultaneously activated upper or lower semiconductor switches are those semiconductor switches between which a switchover occurs in fundamental frequency operation.

3. The method of claim 1, wherein one lower semiconductor switch is active while two upper semiconductor switches are at least temporarily simultaneously activated, and one upper semiconductor switch is active while two lower semiconductor switches are at least temporarily simultaneously activated.

4. The method of claim 3, wherein each semiconductor switch of the upper semiconductor switches is connected to a corresponding lower semiconductor switch at a center tap, with each center tap connected to a different phase of the line voltage in one-to-one correspondence, the method further comprising the step of: tracking the estimated power supply angle based on a total voltage in the phases connected by the simultaneously activated semiconductor switches.

5. The method of claim 4, further comprising the steps of forming a correction value from the total voltage, and tracking the estimated power supply angle based on the correction value.

6. The method of claim 4, further comprising the steps of determining a polarity of the total voltage, and tracking the estimated power supply angle based on the determined polarity.

7. A converter device, comprising:
   a line-side fundamental-frequency-clocked converter having a bridge circuit equipped with controllable semiconductor switches arranged as upper and lower semiconductor switches, wherein the upper semiconductor switches are connected to a first DC link terminal operating at a first DC link potential, and the lower semiconductor switches are connected to a second DC link terminal operating at a second DC link potential,
   means for simultaneously activating two upper or lower semiconductor switches during fundamental frequency operation for a predetermined time period before or after a natural trigger instant of the semiconductor switches caused by a line voltage angle,
   means for simultaneously measuring two phase currents while the two upper or two lower semiconductor switches are simultaneously active, and
   means for determining tracking of an estimated power supply angle for clocking of the semiconductor switches based on the two measured phase currents.

8. The converter device of claim 7, wherein each semiconductor switch of the upper semiconductor switches is connected to a corresponding lower semiconductor switch at a center tap, with each center tap connected to a different phase of the line voltage in one-to-one correspondence, and wherein the estimated power supply angle is tracked based on a total voltage in the phases connected by the simultaneously activated semiconductor switches.

9. The converter device of claim 7, wherein the means for simultaneously activating two upper or lower semiconductor switches comprise a memory that stores a plurality of patterns representing test signals, with selected test signals being used to activate the two upper or the two lower semiconductor switches.

10. The converter device of claim 1, wherein the bridge circuit comprises three upper semiconductor switches and three lower semiconductor switches.

11. The converter device of claim 7, wherein the bridge circuit comprises three upper semiconductor switches and three lower semiconductor switches.

12. The converter device claim 7, wherein the means for simultaneously activating two upper or lower semiconductor switches, the means for simultaneously measuring two phase currents, and the means for determining tracking are embodied in a computer.

* * * * *